(12) United States Patent
Clauson et al.

(10) Patent No.: US 12,181,072 B2
(45) Date of Patent: Dec. 31, 2024

(54) PRESSURE RELIEF VALVE WITH DAMPER

(71) Applicant: Raytheon Technologies Corporation, Farmington, CT (US)

(72) Inventors: Jesse W. Clauson, Agawam, MA (US); Robert B. Goodman, West Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 84 days.

(21) Appl. No.: 17/990,362

(22) Filed: Nov. 18, 2022

(65) Prior Publication Data

US 2023/0407990 A1 Dec. 21, 2023

Related U.S. Application Data (60) Provisional application No. 63/352,266, filed on Jun. 15, 2022.

(51) Int. Cl.
*F16K 47/00* (2006.01)
*F16K 17/04* (2006.01)

(52) U.S. Cl.
CPC ........ *F16K 47/011* (2021.08); *F16K 17/0433* (2013.01); *Y10T 137/7851* (2015.04)

(58) Field of Classification Search
CPC .......................... Y10T 137/7851; F16K 47/011
See application file for complete search history.

(56) References Cited

U.S. PATENT DOCUMENTS

| | | |
|---|---|---|
| 269,914 A | 1/1883 | Brayton |
| 843,988 A | 2/1907 | Barton |
| 1,994,320 A | 3/1935 | McLaughlin |
| 2,268,227 A * | 12/1941 | Rose ...................... F16K 17/065 137/538 |
| 2,583,295 A * | 1/1952 | Greer ...................... B60T 11/32 137/514.7 |
| 3,038,561 A * | 6/1962 | Rumsey .................. F16F 9/145 188/278 |
| 4,027,474 A * | 6/1977 | Demase .................. F02C 7/228 137/881 |
| 4,250,916 A * | 2/1981 | Hoffmann ........... F16K 47/0111 137/514.5 |

(Continued)

FOREIGN PATENT DOCUMENTS

DE 202005006612 U1 6/2005

OTHER PUBLICATIONS

EP Search Report for EP Patent Application No. 23179602.0 dated Nov. 8, 2023.

(Continued)

*Primary Examiner* — Craig M Schneider
*Assistant Examiner* — Frederick D Soski
(74) *Attorney, Agent, or Firm* — Getz Balich LLC (57) ABSTRACT

A pressure relief valve is provided that includes a valve housing, a poppet valve and a damper. The valve housing includes a valve seat and a bore. The poppet valve includes a head and a stem. The head is configured to engage the valve seat when the poppet valve is in a closed position. The head is configured to disengage the valve seat when the poppet valve is in an open position. The stem projects axially out from the head and through the bore. The damper includes a damper chamber axially between the valve housing and the head.

15 Claims, 7 Drawing Sheets

(56) References Cited

U.S. PATENT DOCUMENTS

| | | | | |
|---|---|---|---|---|
| 4,552,172 | A | * | 11/1985 | Krieger ................. F16K 47/012 137/538 |
| 4,719,940 | A | * | 1/1988 | Beavers ............. G05D 16/0663 137/505.39 |
| 4,724,866 | A | * | 2/1988 | Bates .................... F16K 47/011 137/514.7 |
| 5,261,450 | A | | 11/1993 | Betts |
| 6,902,156 | B2 | | 6/2005 | Muramatsu |
| 11,118,698 | B2 | | 9/2021 | Alecu |
| 11,434,987 | B2 | * | 9/2022 | Leque .................... F16H 55/06 |
| 2006/0037646 | A1 | | 2/2006 | Wilhelm |
| 2006/0233657 | A1 | * | 10/2006 | Bonear ................. F04C 28/28 418/55.6 |
| 2008/0135110 | A1 | | 6/2008 | Vasquez |
| 2011/0114203 | A1 | * | 5/2011 | Mazzoni ............. F16K 17/0433 137/514 |
| 2012/0048398 | A1 | * | 3/2012 | Schudt ................ F16H 61/0251 137/514 |

OTHER PUBLICATIONS

Blaine Andersen, "The Analysis and Design of Pneumatic Systems", pp. 42-43, 2001.

* cited by examiner

PRESSURE RELIEF VALVE WITH DAMPER

CROSS-REFERENCE TO RELATED APPLICATIONS

This application claims priority to U.S. Provisional Patent Application No. 63/352,266 filed Jun. 15, 2022, which is hereby incorporated herein by reference in its entirety.

BACKGROUND OF THE DISCLOSURE

1. Technical Field

This disclosure relates generally to a fluid system and, more particularly, to a pressure relief valve for the fluid system.

2. Background Information

A fluid system may include a pressure relief valve to relieve pressure within, for example, a tank. Various types and configurations of pressure relief valves are known in the art. While these known pressure relief valves have various benefits, there is still room in the art for improvement. There is a need in the art, for example, for a pressure relief valve with reduced instabilities.

SUMMARY OF THE DISCLOSURE

According to an aspect of the present disclosure, a pressure relief valve is provided that includes a valve housing, a poppet valve and a damper. The valve housing includes a valve seat and a bore. The poppet valve includes a head and a stem. The head is configured to engage the valve seat when the poppet valve is in a closed position. The head is configured to disengage the valve seat when the poppet valve is in an open position. The stem projects axially out from the head and through the bore. The damper includes a damper chamber axially between the valve housing and the head.

According to another aspect of the present disclosure, another pressure relief valve is provided that includes a valve housing, a valve element and a fluid damper. The valve housing includes a flowpath and a valve seat. The flowpath extends through the valve housing from a flowpath first end to a flowpath second end. The flowpath first end is located at the valve seat. The valve element is configured to move axially between a closed position and an open position. The valve element is configured to engage the valve seat when the valve element is in the closed position to close the flowpath at the flowpath first end. The valve element is configured to disengage the valve seat when the valve element is in the open position to open the flowpath at the flowpath first end. The fluid damper includes a damper chamber disposed at the flowpath first end.

According to still another aspect of the present disclosure, another pressure relief valve is provided that includes a valve housing and a valve element. The valve housing includes a valve mount, an outer wall and a flowpath. The valve mount includes a bore. The outer wall circumscribes and is radially spaced from the valve mount. The outer wall includes a valve seat. The flowpath is radially between the valve mount and the outer wall. The flowpath extends through the valve housing. The valve element includes a head, a stem and a sleeve. The head is configured to engage the valve seat and close the flowpath when the valve element is in a closed position. The head is configured to disengage the valve seat and open the flowpath when the valve element is in an open position. The stem projects axially out from the head and through the bore. The sleeve circumscribes and is radially spaced from stem. The valve mount is radially between stem and the sleeve. A chamber is formed by and axially between the valve mount and the head. A channel is formed by and radially between the valve mount and the sleeve. The channel fluidly couples the chamber with the flowpath.

The damper chamber may be formed by and axially between the valve housing and the valve element.

The valve element may be configured as or otherwise include a poppet valve.

The damper may be configured as or otherwise include a pneumatic damper.

The damper chamber may be formed by an annular surface of the head and an annular surface of the valve housing.

The stem may project axially out from the head at the annular surface of the head. The bore may project axially into the valve housing at the annular surface of the valve housing.

The poppet valve may also include a sleeve spaced radially outward from the stem. The sleeve may project axially out from the head. The valve housing may also include a valve mount disposed radially between the sleeve and the stem. The bore may project axially through the valve mount.

The damper may also include a damper channel radially between the sleeve and the valve mount. The damper channel may be fluidly coupled with the damper chamber.

The damper channel may be an annular channel formed by the sleeve and the valve mount.

A flowpath may extend axially through the valve housing and may be fluidly coupled with the damper chamber through the damper channel. The poppet valve may be configured to close an end of the flowpath when the poppet valve is in the closed position.

The poppet valve may include an inner member and an outer member attached to the inner member. The inner member may include the stem and an inner portion of the head. The outer member may include an outer portion of the head and the sleeve.

The outer member may be mechanically attached to the inner member by an interference fit.

The outer member may be bonded to the inner member.

A flowpath may extend axially through the valve housing and may be fluidly coupled with the damper chamber. The poppet valve may be configured to close an end of the flowpath when the poppet valve is in the closed position.

The damper may be configured to draw gas into the damper chamber from the flowpath when the poppet valve moves towards the open position. The damper may be configured to expel the gas from the damper chamber into the flowpath when the poppet valve moves towards the closed position.

The valve housing may also include a valve mount, an outer wall and a flowpath. The valve mount may include the bore. The outer wall may extend circumferentially around and may be radially spaced from the valve mount. The outer wall may include the valve seat. The flowpath may be radially between the valve mount and the outer wall. The flowpath may extend axially through the valve housing and may be fluidly coupled with the damper chamber.

The valve housing may also include an endwall extending radially between the valve mount and the outer wall. The flowpath may include an annular groove and a plurality of apertures. The annular groove may project axially into the valve housing from the valve seat to the endwall. The apertures may be arranged circumferentially around the valve mount. Each of the apertures may extend axially through the endwall and may be fluidly coupled with the annular groove.

The pressure relief valve may also include a keeper and a spring element. The keeper may be attached to the stem. The spring element may be mounted on the stem. The spring element may be axially between and engaged with the keeper and the valve housing.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
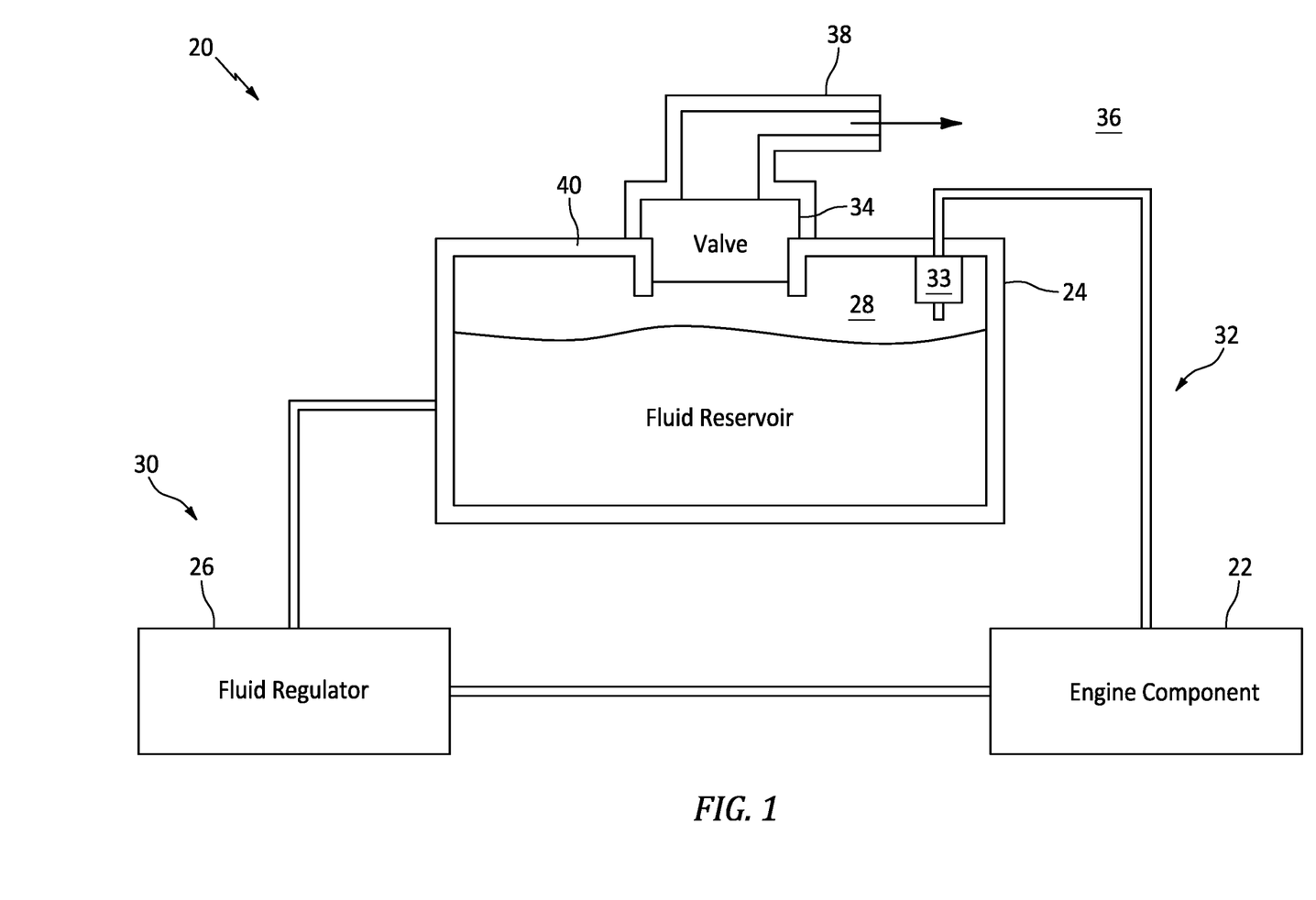
FIG. 1 is a schematic illustration of a fluid system with a pressure relief valve.

FIG. 1 illustrates a fluid system 20 for a gas turbine engine. The gas turbine engine may be configured as part of a propulsion system for an aircraft. The gas turbine engine, for example, may be configured as a turbofan engine, a turbojet engine, a propfan engine, a pusher fan engine, a turboprop engine or a turboshaft engine. The gas turbine engine may also or alternatively be configured as part of an electrical power generation system for the aircraft. The gas turbine engine, for example, may be configured as an auxiliary power unit (APU) engine. The gas turbine engine of the present disclosure, however, is not limited to aircraft applications. The gas turbine engine, for example, may alternatively be configured for a ground-based electrical power generation system. Furthermore, the fluid system 20 of the present disclosure is not limited to gas turbine engine applications. The fluid system 20 of the present disclosure, for example, may be configured to provide working fluid to, receive the working fluid from and/or circulate the working fluid within/through any apparatus which can utilize the working fluid for apparatus operation. The fluid system 20, for example, may alternatively be configured for a reciprocating piston internal combustion (IC) engine, a wind turbine or various other pieces of rotational equipment. For ease of description, however, the fluid system 20 may be described herein with respect to the gas turbine engine.

The fluid system 20 of FIG. 1 is configured to provide (e.g., liquid) working fluid such as lubricant, coolant and/or fuel to, receive the working fluid from and/or circulated the working fluid through at least one component 22 (or multiple components) of the gas turbine engine. Examples of the engine component include, but are not limited to, a bearing, a gear, a transmission, a gearbox, a seal element and a heat exchanger.

The fluid system 20 includes a fluid reservoir 24 (e.g., a fluid tank, a bladder, a pressure vessel, etc.), a fluid regulator 26 (e.g., a pump and/or a control valve) and the engine component 22. The fluid regulator 26 is configured to control the flow of the working fluid between the fluid reservoir 24 and the engine component 22. The fluid regulator 26 of FIG. 1, for example, is fluidly coupled inline between the fluid reservoir 24 and the engine component 22, and the engine component 22 is fluidly coupled inline between the fluid regulator 26 and the fluid reservoir 24. The fluid regulator 26 may thereby direct (e.g., pump) the working fluid out of an internal chamber 28 of the fluid reservoir 24 through a source circuit 30 to the engine component 22. The working fluid may then be collected from the engine component 22 and returned to the fluid reservoir 24 through a return circuit 32. The fluid system 20 of the present disclosure, however, is not limited to the foregoing exemplary fluid system configuration. The fluid system 20, for example, may be configured as a one way circuit where the source circuit 30 or the return circuit 32 may be omitted or combined into a two-way passage. The fluid system may also or alternatively include one or more additional elements (e.g., engine component(s), fluid regulator(s), fluid reservoirs(s), filter(s), sensor(s), etc.) as well as one or more additional (e.g., parallel and/or serial) flow circuits.

During fluid system operation, pressure within the fluid reservoir 24 and its reservoir chamber 28 may rise. For example, gas such as air entrained within the working fluid returned to the fluid reservoir 24 may collect within the fluid reservoir 24 and its reservoir chamber 28, which air may be separated from the working fluid by a deaerator 33 for example. To prevent over pressurization of the fluid reservoir 24, the fluid reservoir 24 of FIG. 1 is configured with a pressure relief valve 34. This pressure relief valve 34 is configured to selectively open to facilitate venting off of the gas, or a mixture of the gas and the working fluid (e.g., a mixture of gas and liquid working fluid mist and/or droplets). This gas or mixture of the gas and the working fluid may be vented to an exterior environment 36 (e.g., ambient, outside environment) through a fluid system vent 38 coupled to the fluid reservoir 24 by the pressure relief valve 34.

Figure 2:
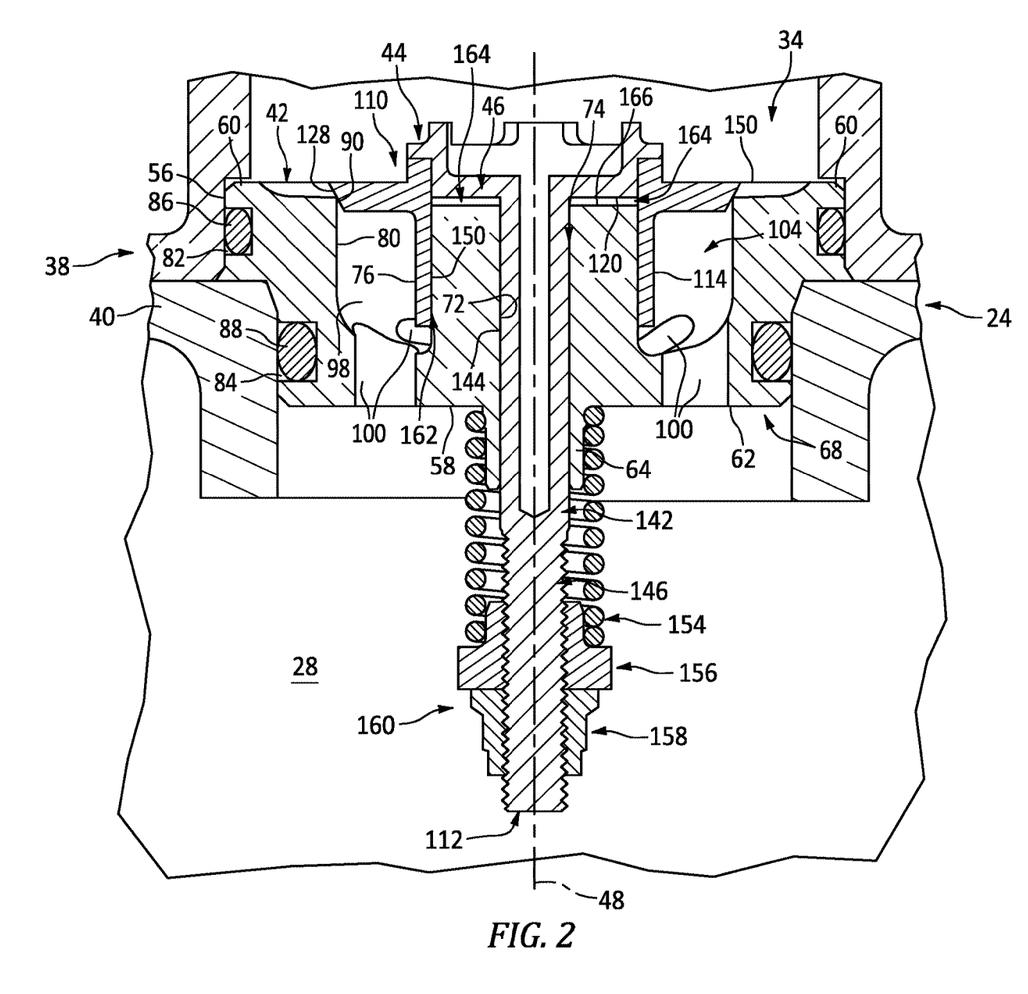
FIG. 2 is a partial side sectional illustration of the pressure relief valve within the fluid system.

Referring to FIG. 2, the pressure relief valve 34 may be arranged at a coupling between a sidewall 40 of the fluid reservoir 24 and the fluid system vent 38. The pressure relief valve 34 of FIG. 2 includes a valve housing 42 and a valve element 44. This pressure relief valve 34 also includes a dynamic fluid (e.g., pneumatic) damper 46 for damping movement of the valve element 44 during pressure relief valve operation.

Figure 3:
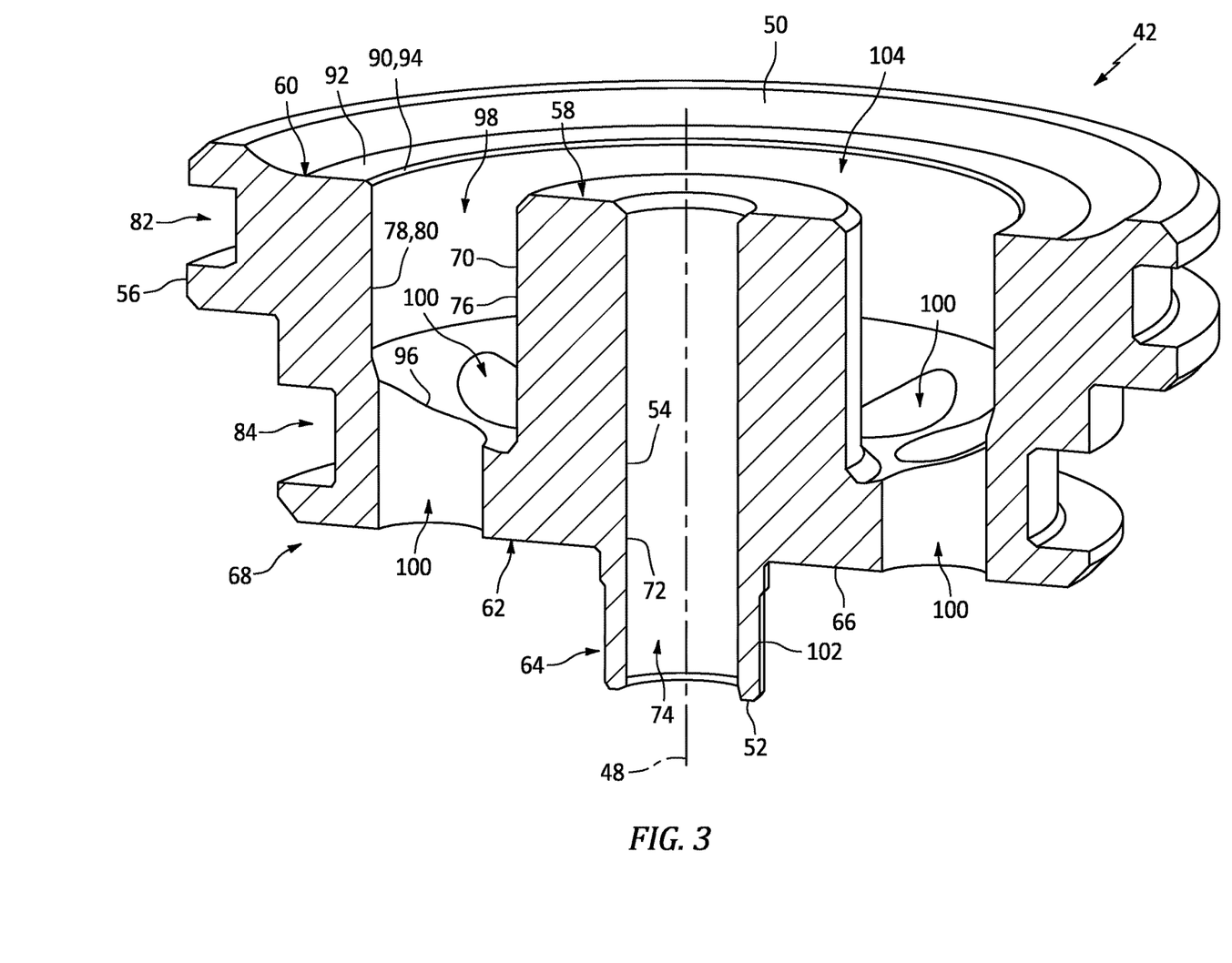
FIG. 3 is a perspective side sectional illustration of a valve housing.
Figure 4:
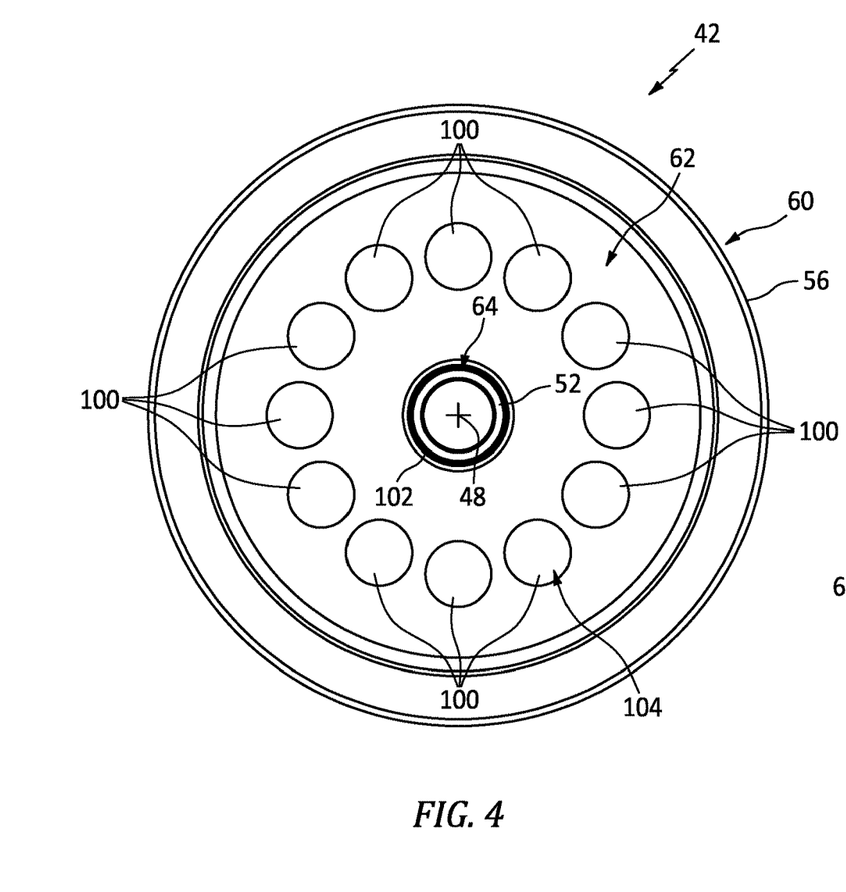
FIG. 4 is an end view illustration of the valve housing.

Referring to FIG. 3, the valve housing 42 extends axially along an axis 48 between a first end 50 of the valve housing 42 and a second end 52 of the valve housing 42, which axis 48 may be a centerline of the pressure relief valve 34. The valve housing 42 extends radially (relative to the axis 48) between and to an inner side 54 of the valve housing 42 and an outer side 56 of the valve housing 42. Referring to FIG. 4, the valve housing 42 extends circumferentially about (e.g., completely around) the axis 48 thereby providing the valve housing 42 with, for example, an annular body. The valve housing 42 of FIG. 3 includes a (e.g., tubular) central valve mount 58, a (e.g., tubular) outer wall 60 and a (e.g., annular) endwall 62. The valve housing 42 of FIG. 3 may also include a housing boss 64.

The valve mount 58 extends axially along the axis 48 from (or about) the housing first end 50 to a second end 66 of a base section 68 of the valve housing 42. The valve mount 58 extends radially between and to the housing inner side 54 and an outer side 70 of the valve mount 58. The valve mount 58 at least partially forms a (e.g., unperforated) cylindrical inner surface 72 at the housing inner side 54. This housing inner surface 72 forms a central internal bore 74, which housing bore 74 extends axially along the axis 48 through the valve housing 42 between and to the housing first end 50 and the housing second end 52. The valve mount 58 also forms a (e.g., unperforated) cylindrical outer surface 76 at the mount outer side 70, which mount outer surface 76 extends axially along the axis 48 from the housing first end 50 to the endwall 62.

The outer wall 60 extends axially along the axis 48 from (or about) the housing first end 50 to the housing base section second end 66. The outer wall 60 extends radially between and to an inner side 78 of the outer wall 60 and the housing outer side 56. The outer wall 60 is spaced radially outboard form and extends circumferentially about (e.g., circumscribes) the valve mount 58 and the endwall 62. The outer wall 60 forms a (e.g., unperforated) cylindrical inner surface 80 at the wall inner side 78, which wall inner surface 80 extends axially along the axis 48 from (or about) the housing first end 50 to the endwall 62. Referring to FIG. 2, the outer wall 60 may also include one or more annular grooves 82 and 84 at its outer periphery (e.g., at the housing outer side 56). Each of these grooves 82, 84 may receive a seal element 86, 88 (e.g., a ring seal, etc.) for sealing an interface between the outer wall 60 and a respective one of the reservoir sidewall 40 and a mount of the fluid system vent 38.

Figure 5:
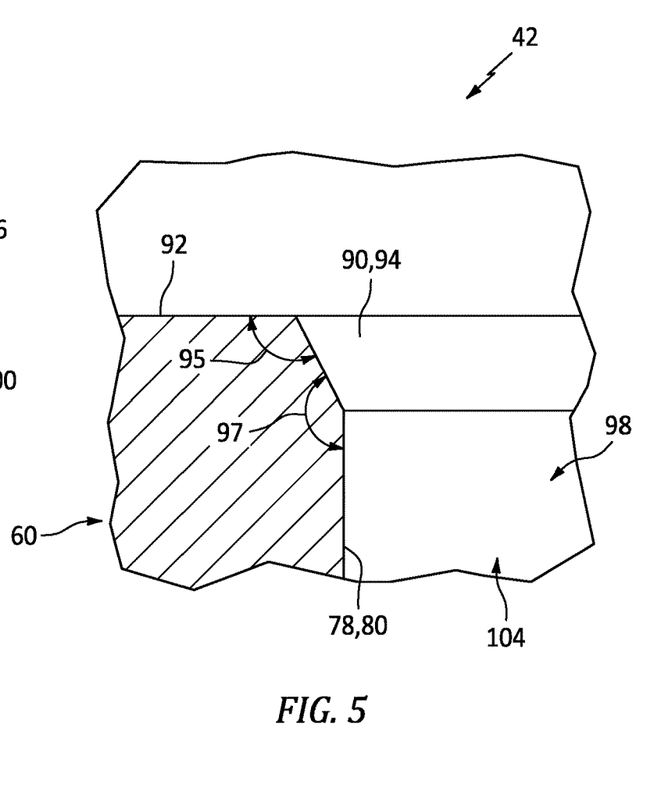
FIG. 5 is a partial side sectional illustration of the valve housing at a valve seat.

Referring to FIG. 3, the outer wall 60 includes a seat 90 for the valve element 44. This valve seat 90 is disposed at the housing first end 50. The valve seat 90 of FIG. 3, for example, is formed at a corner between an annular end surface 92 of the outer wall 60 at the housing first end 50 and the wall inner surface 80. The valve seat 90 may be formed by an annular seat surface 94 which extends circumferentially (e.g., uninterrupted) around the axis 48. Referring to FIG. 5, the seat surface 94 is angularly offset from the wall end surface 92 and the wall inner surface 80 by included angles 95 and 97. The angle 95 may be between one-hundred and twenty degrees (120°) and one-hundred and thirty-five degrees (135°), and the angle 97 may be between one-hundred and thirty-five degrees (135°) and one-hundred and fifty degrees (150°). The present disclosure, however, is not limited to the foregoing exemplary angles.

Referring to FIG. 3, the endwall 62 extends axially along the axis 48 from a first end 96 of the endwall 62 to the housing base section second end 66. The endwall 62 extends radially between and is connected to (e.g., formed integral with or otherwise attached to) the inner valve mount 58 and the outer wall 60. The endwall 62 extends circumferentially about (e.g., circumscribes) the valve mount 58. With this arrangement, the endwall 62 forms an annular groove 98 with the valve mount 58 and the outer wall 60. This housing groove 98 projects axially along the axis 48 into the valve housing 42 from the housing first end 50/the valve seat 90 to the endwall 62 and its endwall first end 96. The housing groove 98 extends radially within the valve housing 42 between and to the mount outer surface 76 and the wall inner surface 80. The housing groove 98 extends circumferentially around (e.g., circumscribes) the valve mount 58 and the axis 48.

Referring to FIG. 4, the endwall 62 is configured with one or more apertures 100; e.g., through-holes, flow channels, etc. These housing apertures 100 of FIG. 4 are arranged circumferentially about the axis 48 and the valve mount 58 (see FIG. 3) in a circular array. Each of the housing apertures 100 may have a circular cross-sectional geometry; however, the present disclosure is not limited thereto. Referring to FIG. 3, each of the housing apertures 100 extends axially through the endwall 62 between and to the endwall first end 96 and the housing base section second end 66.

The housing boss 64 is disposed at the housing second end 52, and the housing boss 64 is connected to (e.g., formed integral with or otherwise attached to) the housing base section 68 and its valve mount 58. This housing boss 64 of FIG. 3, for example, projects axially out from the valve mount 58 to the housing second end 52. The housing boss 64 extends radially between and to the housing inner side 54 and an outer side 102 of the housing boss 64. This housing boss 64 may form another portion of the housing inner surface 72 and, thus, another portion of the housing bore 74.

The valve housing 42 of FIG. 3 is configured with a valve flowpath 104. This valve flowpath 104 extends axially along the axis 48 through the valve housing 42 between and to the housing first end 50 and the housing base section second end 66. The valve flowpath 104 of FIG. 3 includes the housing groove 98 and the one or more housing apertures 100, which housing apertures 100 are fluidly coupled with and lead to the housing groove 98. Referring to FIG. 2, this valve flowpath 104 provides a fluid coupling between the fluid reservoir 24 and the fluid system vent 38 when the pressure relief valve 34 is open; see also FIG. 8.

Figure 6:
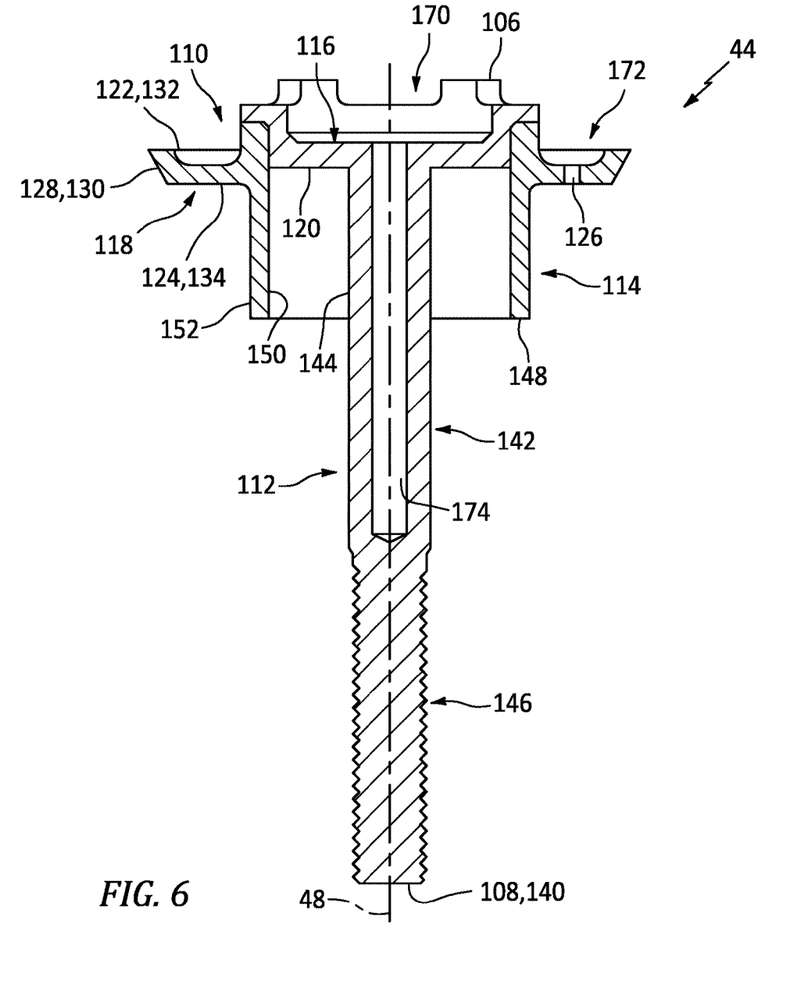
FIG. 6 is a side sectional illustration of a valve element such as a poppet valve.

Referring to FIG. 6, the valve element 44 extends axially along the axis 48 between and to a first end 106 of the valve element 44 and a second end 108 of the valve element 44. The valve element 44 may be configured as a (e.g., sleeved) poppet valve. The valve element 44 of FIG. 6, for example, includes a valve head 110, a valve stem 112 and a (e.g., tubular) valve sleeve 114; e.g., a damper sleeve.

The valve head 110 is disposed at the valve first end 106. The valve head 110 includes an inner portion 116 (e.g., a damper portion) and an outer portion 118 (e.g., a poppet portion) radially outboard of and circumscribing the head inner portion 116. The head inner portion 116 extends axially along the axis 48 to an (e.g., unperforated) annular damper end surface 120. The head outer portion 118 extends axially along the axis 48 between and to a first side 122 of the head outer portion 118 and a second side 124 of the head outer portion 118. The head outer portion 118 of FIG. 6 is axially offset from the head inner portion 116 by an axial jog; however, the present disclosure is not limited to such an exemplary arrangement. The head outer portion 118 may be configured without any perforations between its sides 122 and 124. However, in other embodiments, the head outer portion 118 may include at least (or only) one vent hole 126 extending axially through the head outer portion 118 between its sides 122 and 124.

Figure 7:
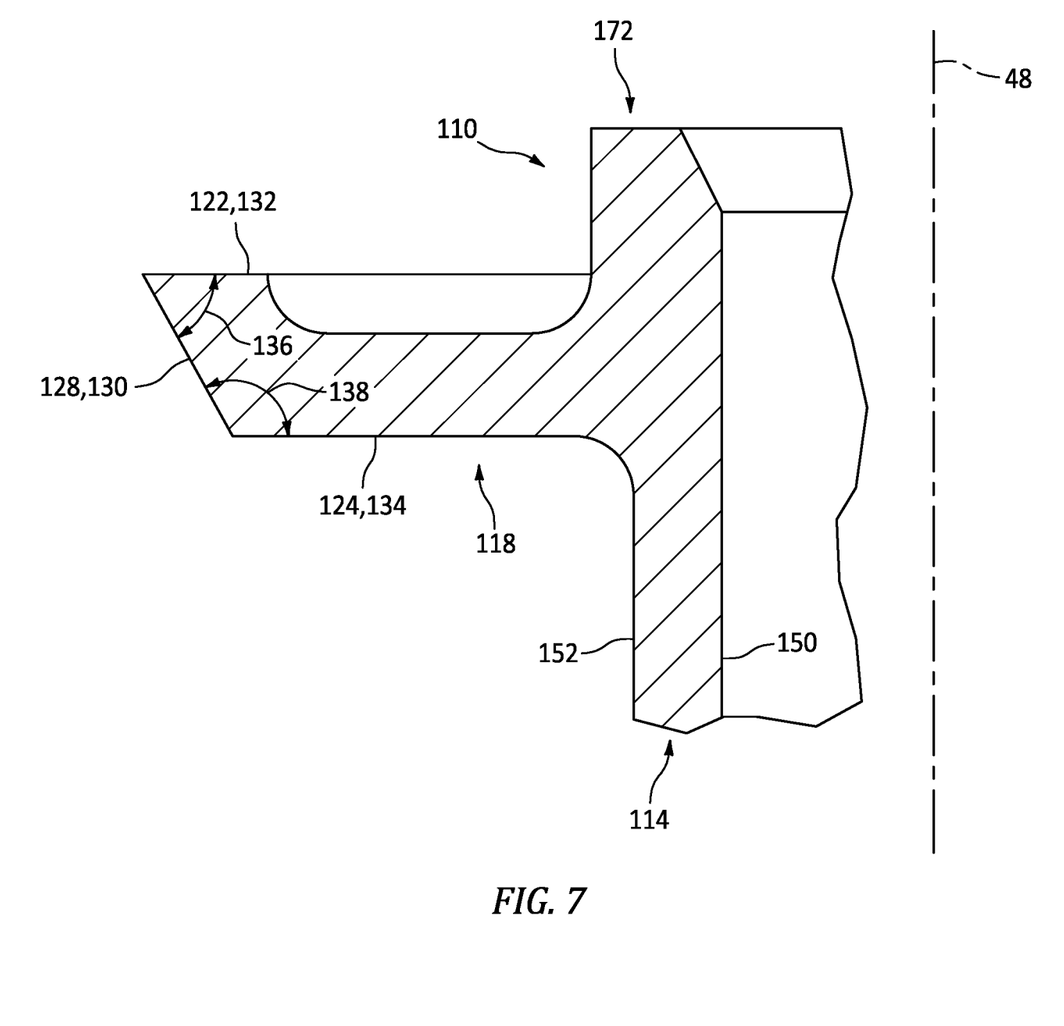
FIG. 7 is a partial side sectional illustration of an outer member of the valve element at a seal face.

The valve head 110 and its head outer portion 118 project radially out to an annular seal face 128 at an outer periphery of the valve head 110. The seal face 128 may be formed by an annular seal surface 130 which extends circumferentially (e.g., uninterrupted) around the axis 48. Referring to FIG. 7, the seal face 128 and its seal surface 130 are angularly offset from an annular first side surface 132 of the valve head 110 at the outer portion first side 122 and an annular second side surface 134 of the valve head 110 at the outer portion second side 124 by included angles 136 and 138. The angle 136 may be between forty-five degrees (45°) and sixty degrees (60°), and the angle 138 may be between one-hundred and twenty degrees (120°) and one-hundred and thirty-five degrees (135°). The present disclosure, however, is not limited to the foregoing exemplary angles.

Referring to FIG. 6, the valve stem 112 is connected to (e.g., formed integral with or otherwise attached to) the valve head 110 and its head inner portion 116 at a radial center of the valve head 110. This valve stem 112 projects axially out from the valve head 110 and its head inner portion 116 to a (e.g., unsupported) distal end 140 of the valve stem 112 at the valve second end 108. A first portion 142 of the valve stem 112 projects radially out to a (e.g., uninterrupted) cylindrical outer surface 144 of the valve stem 112. This stem outer surface 144 extends axially along the axis 48 to the damper end surface 120. A second portion 146 of the valve stem 112 may be threaded. This stem second portion 146 extends axially along the axis 48 out from the stem first portion 142 to the valve second end 108.

The valve sleeve 114 is connected to (e.g., formed integral with or otherwise attached to) the valve head 110 at a coupling/an interface (e.g., the jog) between the head inner portion 116 and the head outer portion 118. The valve sleeve 114 projects axially out from the valve head 110 to a (e.g., unsupported) distal end 148 of the valve sleeve 114. The valve sleeve 114 is spaced radially outboard from and extends circumferentially about (e.g., circumscribes) the valve stem 112 and its stem first portion 142. The valve sleeve 114 extends radially between and to a (e.g., uninterrupted) cylindrical inner surface 150 of the valve sleeve 114 and a (e.g., uninterrupted) cylindrical outer surface 152 of the valve sleeve 114.

Referring to FIG. 2, the valve element 44 is mated with the valve housing 42. The valve stem 112 and its stem first portion 142, for example, are received within the housing bore 74. The stem outer surface 144 may engage (e.g., contact) the housing inner surface 72 such that the stem outer surface 144 may slide axially along the housing inner surface 72. The valve element 44 and its valve stem 112 may thereby axially translate along the valve housing 42 and its valve mount 58. A spring element 154 (e.g., a coil spring) is mounted on the valve stem 112. This spring element 154 is mounted on the housing boss 64 on one end and on an annular bushing 156 on the other end, where the bushing 156 is mounted on the valve stem 112. The spring element 154 extends axially between and engages (e.g., contacts) the housing base section 68 and its valve mount 58 and the bushing 156. A nut 158 is mated with the threaded stem second portion 146 to secure the bushing 156 and the spring element 154 onto the valve stem 112. The nut 158 also secures the valve element 44 to the valve housing 42. The nut 158 and the bushing 156 may thereby form a keeper 160 for retaining the spring element 154 and the valve element 44 in position.

The valve sleeve 114 is received within the housing groove 98 and arranged in close proximity to the valve mount 58. The sleeve inner surface 150 may thereby axially and circumferentially overlap the mount outer surface 76. A slight control gap is proved between the sleeve inner surface 150 and the mount outer surface 76 to form a (e.g., annular) damper channel 162 (see also FIG. 8) radially between the sleeve inner surface 150 and the mount outer surface 76. This damper channel 162 extends axially between and thereby fluidly couples the valve flowpath 104 and its housing groove 98 with a (e.g., annular) damper chamber 164 (see also FIG. 8).

Figure 8:
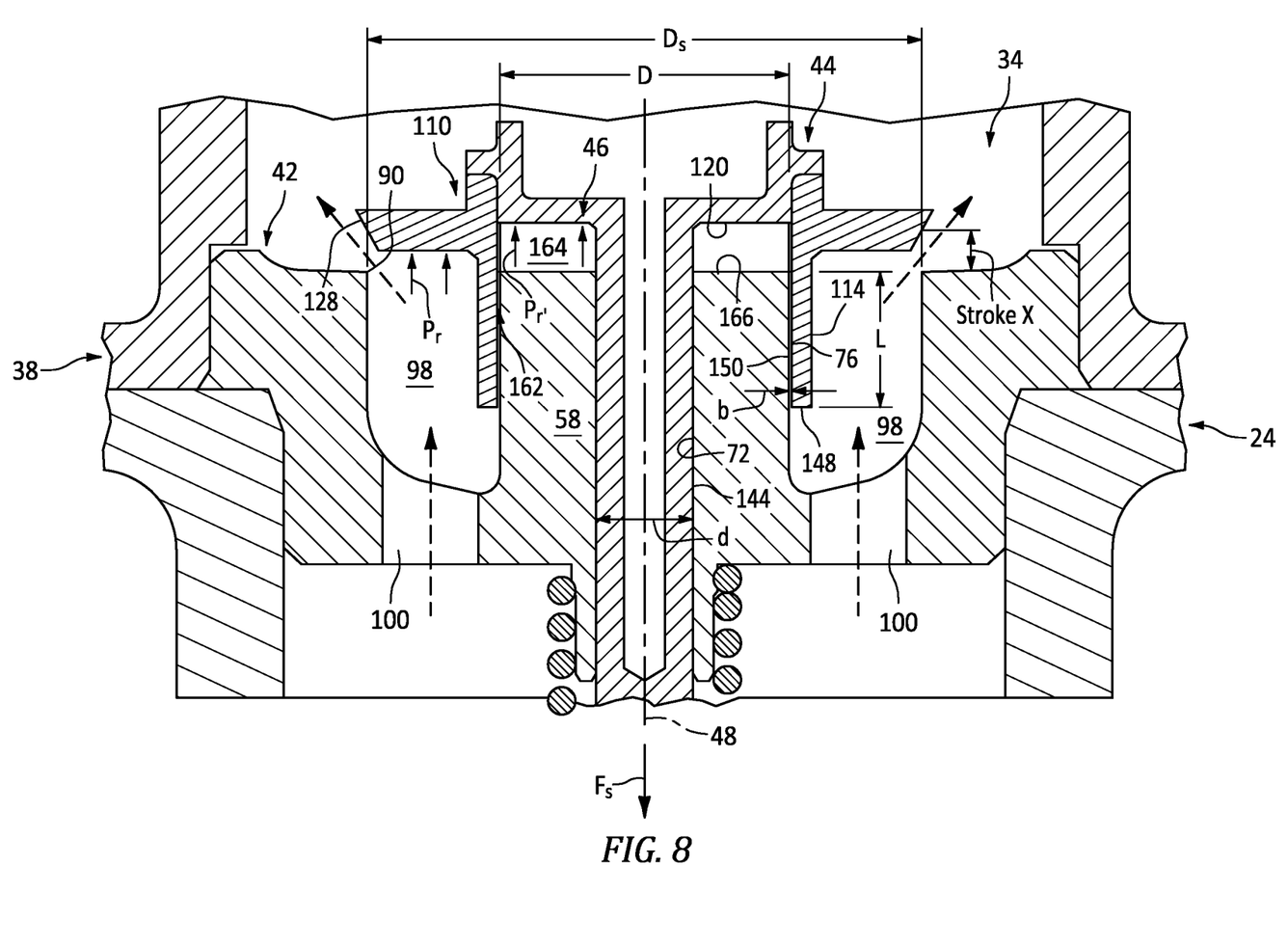
FIG. 8 is a force diagram for the pressure relief valve.

The damper chamber 164 is formed by and extends axially between the damper end surface 120 and a (e.g., unperforated) annular surface 166 of the valve mount 58 at the housing first end 50. The damper chamber 164 extends radially between and to the stem outer surface 144 and the sleeve inner surface 150. The damper chamber 164 extends circumferentially around (e.g., circumscribes) the valve stem 112.

The fluid damper 46 of FIG. 2 includes the damper chamber 164 and the damper channel 162. The fluid damper 46 also includes/is formed by the various portions of the valve housing 42 and the valve element 44 that form the damper chamber 164 and the damper channel 162.

During operation of the pressure relief valve 34, the spring element 154 biases the valve element 44 into a closed position. In this closed position, the valve head 110 and its seal face 128 engage (e.g., contact) the outer wall 60 and its valve seat 90. The valve head 110 may thereby close off an end of the valve flowpath 104 at the valve seat 90/the valve head 110. The pressure relief valve 34 therefore fluidly decouples the fluid reservoir 24 from the fluid system vent 38 when the valve element 44 is in its closed position. However, when a pressure force exerted by the gas within the fluid reservoir 24 and, thus, the housing groove 98 exceeds a bias force of the spring element 154, the gas may push the valve head 110 axially away from the outer wall 60 and its valve seat 90. This movement forms an annular opening 168 (see FIG. 8) between the valve head 110 and the valve seat 90, which annular opening 168 opens the valve flowpath 104 and fluidly coupled the valve flowpath 104 with the fluid system vent 38.

While the valve element 44 axially translates between the open position and the closed position, the fluid damper 46 damps the movement of the valve element 44. This damping may reduce or eliminate valve instabilities resulting from, for example, sudden changes in gas pressure within the reservoir chamber 28. For example, when the valve element 44 and its valve head 110 move axially away from the valve seat 90, an axial length of the damper chamber 164 increases. This increase in the axial length increases a volume of the damper chamber 164, which thereby draws the gas into the damper chamber 164 from the valve flowpath 104 through the damper channel 162. This drawing (e.g., suction) force acts in opposition to the opening force of the gas. The fluid damper 46 may thereby damp (e.g. hold back) the opening movement of the valve element 44. Similarly, when the valve element 44 and its valve head 110 move axially towards the valve seat 90, the axial length of the damper chamber 164 decreases. This decrease in the axial length decreases the volume of the damper chamber 164, which thereby expels the gas from the damper chamber 164 into the valve flowpath 104 through the damper channel 162. This expulsion force acts in opposition to the closing force of the spring element 154. The fluid damper 46 may thereby damp (e.g. hold back) the closing movement of the valve element 44. Characteristics of this fluid damper 46 may be tuned, for example, by increasing or decreasing the control gap between the sleeve inner surface 150 and the mount outer surface 76 among other valve parameters.

FIG. 8 illustrates a force diagram for the pressure relief valve 34. "L" is an axial distance measured between the distal end 148 of the valve sleeve 114 and the annular surface 166 of the valve mount 58. "b" is a radial distance measured between the sleeve inner surface 150 and the mount outer surface 76—the control gap. "D" is a diameter of the sleeve inner surface 150. "Ds" is a diameter of the valve seat 90. "d" is a diameter of the stem outer surface 144. Characteristic for the annular opening 168 (annular restriction) may be described using by the following equation:

$$\frac{dW}{d\Delta P_{1-2}} = \frac{\pi D b^3 \left[1 \div 1.5(\epsilon/b)^2\right] P}{12\mu LRT}$$

which relates change (dW) versus dP or (Pr'−Pr). The change across the annular opening 168 may be equated to the displaced flow. The displaced flow may be determined as density times area times velocity or (P/RT)×Ad×(dX/dt). Flow across the annular opening 168 may be equal to (dW/dP)×dP. The following equation may thereby describe the pressure drop across the annular opening 168:

$$d(Pr' - Pr) = \left(\frac{P}{RT}\right) \times \left(\frac{dx}{dt}\right) \times Ad/(dW/dP)$$

This pressure drop provides a feedback force across the area (Ad) as the valve element 44 tries to close, and may thereby attenuate valve instabilities.

The pressure relief valve 34 may be configured for laminar flow across the annular opening 168. The present disclosure, however, is not limited to laminar flow embodiments.

Referring to FIG. 6, the valve element 44 may be configured as a multi-member body. The valve element 44 of FIG. 6, for example, includes an inner member 170 and an outer member 172. The inner member 170 may include the valve stem 112 and the head inner portion 116. The outer member 172 may include the head outer member 172 and the valve sleeve 114. This outer member 172 is attached to the inner member 170 to provide the valve element 44. The outer member 172, for example, may be mechanically attached to the inner member 170 by an interference fit; e.g., press-fit connection. Alternatively, the outer member 172 may be bonded (e.g., brazed) to and/or otherwise attached to the inner member 170. Of course, in other embodiments, it is contemplated the entire valve element 44 may be formed as a single monolithic body using, for example, casting and/or additive manufacturing.

In some embodiments, referring to FIG. 6, the valve element 44 may include a central bore 174 to decease the weight of the valve element 44. The valve bore 174 of FIG. 6 projects axially along the axis 48 through the valve head 110 and partially into the valve element 44. This valve bore 174 may extend within the valve element 44 to or about an interface between the stem first portion 142 and the stem second portion 146.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A pressure relief valve, comprising:
   a valve housing including a valve seat and a bore;
   a poppet valve including a head and a stem, the head engaging the valve seat when the poppet valve is in a closed position, the head disengaged from the valve seat when the poppet valve is in an open position, and the stem projecting axially out from the head and through the bore; and
   a damper comprising a damper chamber axially between the valve housing and the head;
   wherein the poppet valve further includes a sleeve spaced radially outward from the stem, and the sleeve projects axially out from the head; and
   wherein the valve housing further includes a valve mount disposed radially between the sleeve and the stem, and the bore projects axially through the valve mount.

2. The pressure relief valve of claim 1, wherein
   the damper further comprises a damper channel radially between the sleeve and the valve mount; and
   the damper channel is fluidly coupled with the damper chamber.

3. The pressure relief valve of claim 2, wherein the damper channel is an annular channel formed by the sleeve and the valve mount.

4. The pressure relief valve of claim 2, wherein
   a flowpath extends axially through the valve housing and is fluidly coupled with the damper chamber through the damper channel; and
   the poppet valve closes an end of the flowpath when the poppet valve is in the closed position.

5. The pressure relief valve of claim 1, wherein
   the poppet valve comprises an inner member and an outer member attached to the inner member;
   the inner member comprises the stem and an inner portion of the head; and
   the outer member comprises an outer portion of the head and the sleeve.

6. The pressure relief valve of claim 5, wherein the outer member is mechanically attached to the inner member by an interference fit.

7. The pressure relief valve of claim 5, wherein the outer member is bonded to the inner member.

8. The pressure relief valve of claim 1, wherein
   a flowpath extends axially through the valve housing and is fluidly coupled with the damper chamber; and
   the poppet valve closes an end of the flowpath when the poppet valve is in the closed position.

9. The pressure relief valve of claim 8, wherein
   the damper draws gas into the damper chamber from the flowpath when the poppet valve moves towards the open position; and
   the damper expels the gas from the damper chamber into the flowpath when the poppet valve moves towards the closed position.

10. The pressure relief valve of claim 1, wherein the damper comprises a pneumatic damper.

11. The pressure relief valve of claim 1, wherein the damper chamber is formed by an annular surface of the head and an annular surface of the valve housing.

12. A pressure relief valve, comprising:
   a valve housing including a valve seat and a bore;
   a poppet valve including a head and a stem, the head engaging the valve seat when the poppet valve is in a closed position, the head disengaged from the valve seat when the poppet valve is in an open position, and the stem projecting axially out from the head and through the bore; and
   a damper comprising a damper chamber axially between the valve housing and the head;
   wherein the valve housing further includes
   a valve mount comprising the bore; and an outer wall extending circumferentially around and radially spaced from the valve mount, the outer wall comprising the valve seat; and a flowpath radially between the valve mount and the outer wall, the flowpath extending axially through the valve housing and fluidly coupled with the damper chamber.

13. The pressure relief valve of claim 12, wherein the valve housing further includes an endwall extending radially between the valve mount and the outer wall;

the flowpath comprises an annular groove and a plurality of apertures;

the annular groove projects axially into the valve housing from the valve seat to the endwall; and the plurality of apertures arranged circumferentially around the valve mount, and each of the plurality of apertures extends axially through the endwall and is fluidly coupled with the annular groove.

14. A pressure relief valve, comprising:

a valve housing including a valve seat and a bore;

a poppet valve including a head and a stem, the head engaging the valve seat when the poppet valve is in a closed position, the head disengaged from the valve seat when the poppet valve is in an open position, and the stem projecting axially out from the head and through the bore;

a damper comprising a damper chamber axially between the valve housing and the head;

a keeper attached to the stem; and a spring element mounted on the stem, the spring element axially between and engaged with the keeper and the valve housing.

15. A pressure relief valve, comprising:

a valve housing including a valve mount, an outer wall and a flowpath, the valve mount comprising a bore, the outer wall circumscribing and radially spaced from the valve mount, the outer wall comprising a valve seat, the flowpath radially between the valve mount and the outer wall, and the flowpath extending through the valve housing; and a valve element including a head, a stem and a sleeve, the head engaging the valve seat and closing the flowpath when the valve element is in a closed position, the head disengaged from the valve seat and opening the flowpath when the valve element is in an open position, the stem projecting axially out from the head and through the bore, and the sleeve circumscribing and radially spaced from the stem;

the valve mount radially between the stem and the sleeve;

a chamber formed by and axially between the valve mount and the head; and a channel formed by and radially between the valve mount and the sleeve, the channel fluidly coupling the chamber with the flowpath.

* * * * *